United States Patent
Obata et al.

(10) Patent No.: US 7,659,651 B2
(45) Date of Patent: Feb. 9, 2010

(54) ROTATING ELECTRIC MACHINE, WINDING MACHINE, AND ROTATING ELECTRIC MACHINE SYSTEM

(75) Inventors: Koji Obata, Hitachi (JP); Masaharu Senoo, Narashino (JP); Takeshi Obata, Narashino (JP); Akihiro Sekine, Kitakatsushika (JP); Mituru Itou, Funabashi (JP); Takashi Yasuhara, Yotsukaido (JP); Takayuki Koizumi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 269 days.

(21) Appl. No.: 11/836,876

(22) Filed: Aug. 10, 2007

(65) Prior Publication Data

US 2008/0315705 A1    Dec. 25, 2008

(30) Foreign Application Priority Data

Aug. 24, 2006    (JP)    .............................. 2006-227289

(51) Int. Cl.
H02K 3/28    (2006.01)
H02K 3/50    (2006.01)

(52) U.S. Cl. ........................ 310/180; 310/184; 310/208
(58) Field of Classification Search .................. 310/179, 310/180, 184, 198, 208
See application file for complete search history.

(56) References Cited

U.S. PATENT DOCUMENTS 2,575,716 A * 11/1951 Kilgore ...................... 318/771
4,363,985 A * 12/1982 Matsuda et al. ............. 310/184
6,281,609 B1 * 8/2001 Itami et al. ................ 310/68 B
7,262,538 B2 * 8/2007 Yoneda et al. .............. 310/179

FOREIGN PATENT DOCUMENTS

JP    50(1975)-301    1/1975

OTHER PUBLICATIONS

IEEJ Technical Report, vol. 739, pp. 14-20, Inverter Surge Insulation Investigation Special Committee issued on Aug. 1999 Influence Of Inverter Surge on Electric Insulation Systems, Aug. 1999.
Hitosugi et al, "Measured Characteristic of Induction Motor With Reduced Turns of Terminal Coils" pp-19-23, Issued on Oct. 18, 2000, Papers of Technical Meeting, IEEJ Technical Meeting on Rotating Machinery, RM-00-92 to RM-00-109, Oct. 18, 2000.
Ieda et al "Chapter 3 Insulation of High-Voltage Devices" pp. 92-93, Modern High Voltage Engineering, Ohmsha.

* cited by examiner

Primary Examiner—Tran N Nguyen
(74) Attorney, Agent, or Firm—Antonelli, Terry, Stout & Kraus, LLP.

(57) ABSTRACT

A rotating electric machine includes a stator core of a cylindrical shape, a rotor core coaxially rotating inside the stator core, and a plurality of coils each formed by winding magnet wires using a slot formed axially in either the stator core or the rotor core, or both: it is preferable that each of the coils be split into a plurality of coil groups, that starting sections of winding of the magnet wires in one of the coil groups be wound adjacently to ending sections of winding of the magnet wires in another of the coil groups, and that the starting sections and ending sections of winding of the magnet wires in the two coil groups be connected at respective outgoing wire ends to one another, outside the slots.

20 Claims, 13 Drawing Sheets

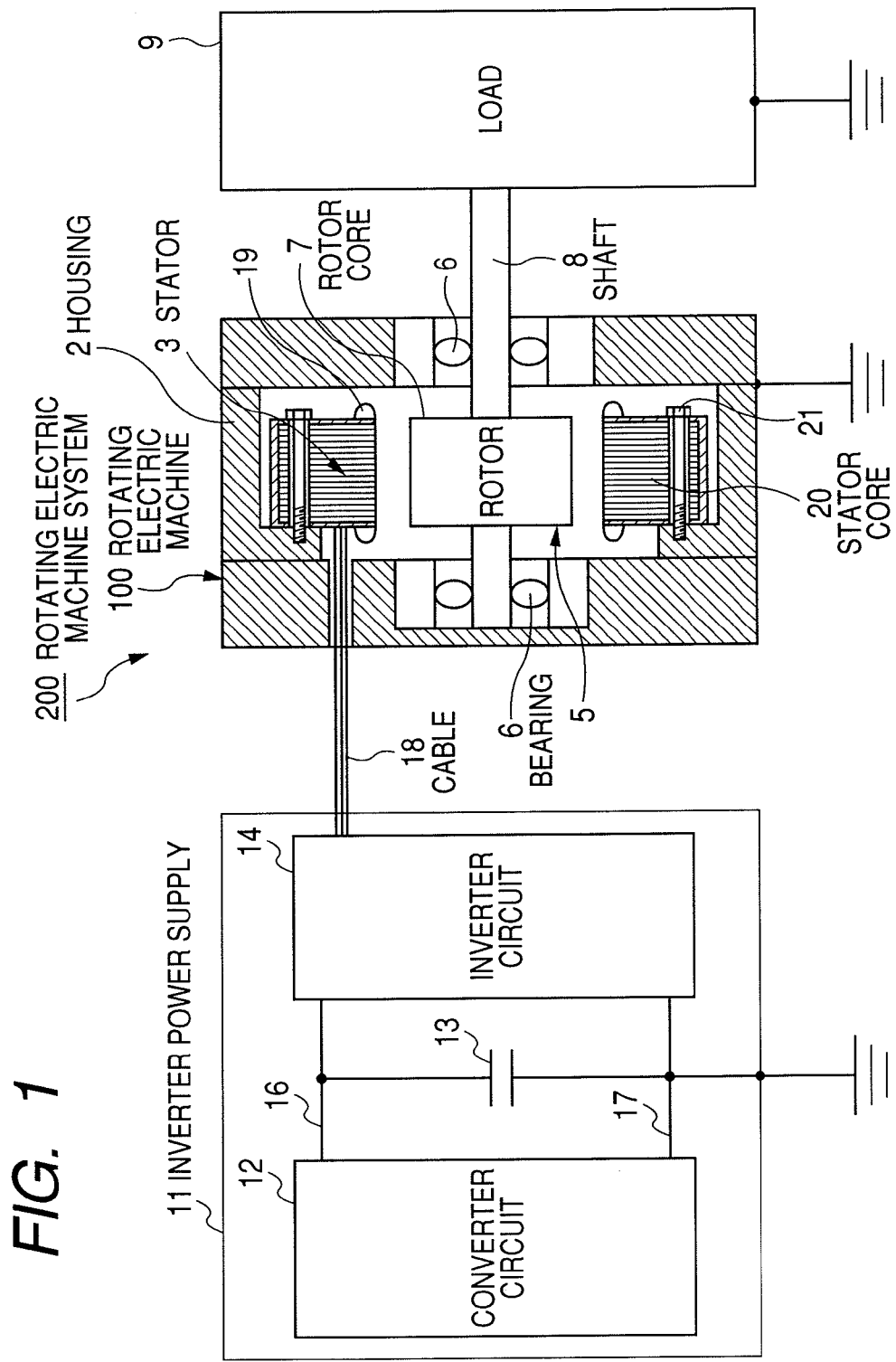

VERTICAL AXIS : 300 V/div   HORIZONTAL AXIS : 0.2 μs/div

VERTICAL AXIS : 300 V/div   HORIZONTAL AXIS : 2 ms/div

TURN-TO-CORE VOLTAGE : 62.5%/div   TURN-TO-TURN VOLTAGE : 50%/div
TIMEBASE (HORIZONTAL AXIS) : 0.5 μs/div

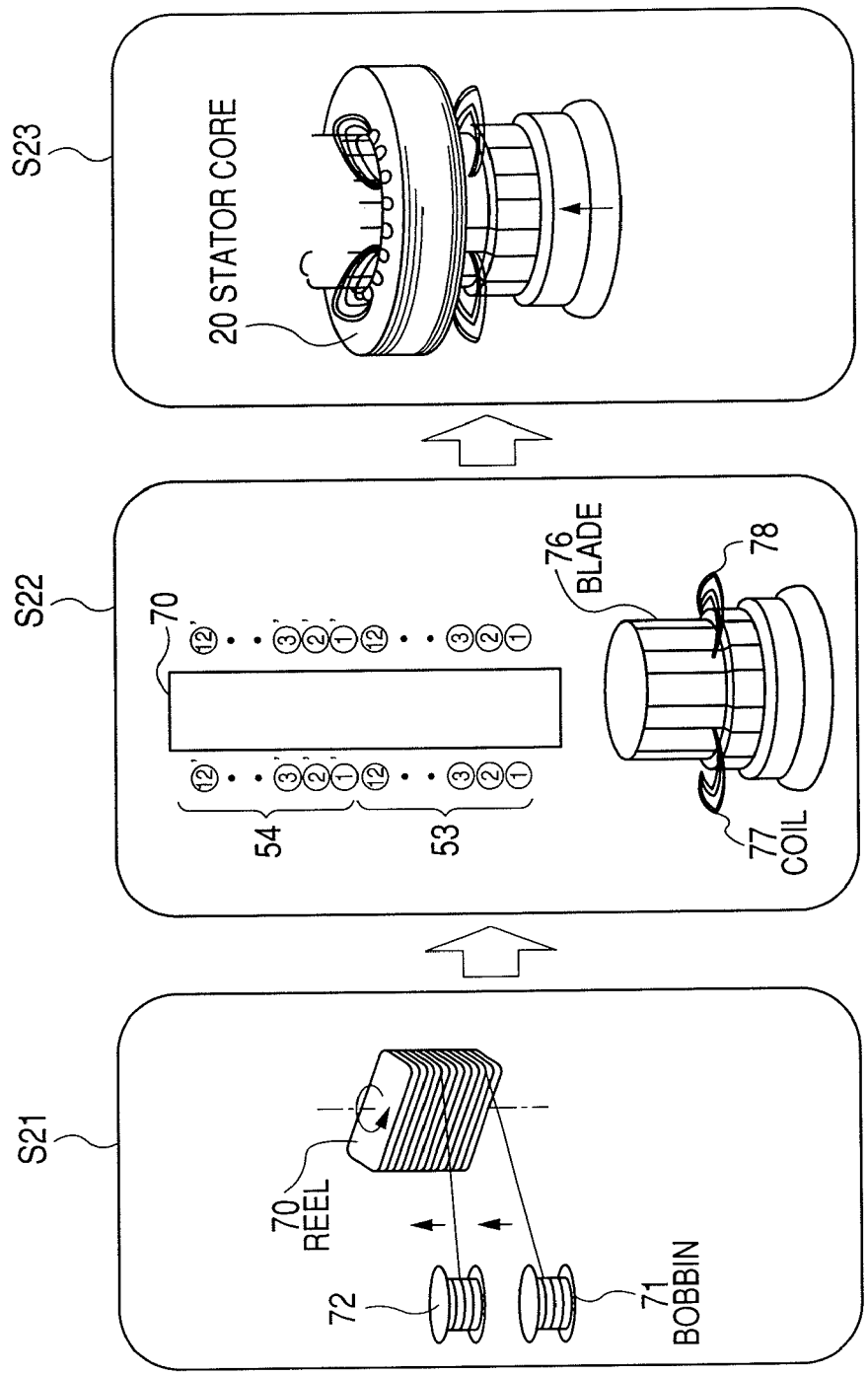

ROTATING ELECTRIC MACHINE, WINDING MACHINE, AND ROTATING ELECTRIC MACHINE SYSTEM

CLAIM OF PRIORITY

The present application claims priority from Japanese application serial No. 2006-227289, filed on Aug. 24, 2006, the content of which is hereby incorporated by reference into this application.

FIELD OF THE INVENTION

The present invention relates to a rotating electric machine in which a plurality of coils each formed by winding a magnet wire are each broken down into a plurality of coil groups. The invention also concerns a winding machine, a rotating electric machine system, a hybrid electric vehicle, a fuel cell electric vehicle, and an electric vehicle.

BACKGROUND OF THE INVENTION

In recent years, adjustable-speed operation of the motors (rotating electric machines) each using an inverter is prevalent in terms of energy saving. However, when a motor is driven by an inverter that generates a rectangular-wave voltage, if a steep-fronted surge voltage is generated by the inverter and causes a high voltage between the motor coil turns, this could result in insulation deterioration between the coil turns (refer to Non-Patent Reference 1).

Regarding this turn-to-turn insulation deterioration problem, Non-Patent Reference 2 proposes a method of strengthening the turn-to-turn insulation by, for example, increasing the thickness thereof in addition to reducing the number of turns of the lead wire forming a first coil to which the surge voltage from the inverter is applied. However, as described in Non-Patent Reference 2, insulation strengthening has had its limits since the rotating electric machine changes in mechanical output characteristics.

Also, Non-Patent Reference 3 discloses designing a rotating electric machine for reduced capacitance between a turn and a core, against the capacitance between turns, in order to improve the turn-to-turn insulation distribution.

In addition, Patent Reference 1 proposes a method of alleviating a turn-to-turn voltage share in a high-voltage rotating electric machine by connecting a capacitor for adjusting distributed capacitance between turns, from the external section of a winding.

[Patent Reference 1: Japanese Patent Laid-open No. Sho 50(1975)-301 (JP-A-1975-301), What is Claimed is, FIGS. 3, 6]

[Non-Patent Reference 1: IEEJ Technical Report, Vol. 739, pp. 14-20, issued in August 1999] (IEEJ: Institute of Electrical Engineers of Japan)

[Non-Patent Reference 2: "Characterization Tests on Induction Motor with Reduced Number of Terminal Coil Turns", material for technical presentation in the IEEJ Rotating Machines Working Group, RM-00-92 to RM-00-109, p. 19, Hitosugi Kazuyoshi, Shoji Moriyasu]

[Non-Patent Reference 3: "Modern High-Voltage Engineering", pp. 91-93, written by Uchida Masayuki, published by Ohmsha, Ltd.]

SUMMARY OF THE INVENTION

In a rotating electric machine for low-voltage operation at less than 1 kVrms, however, no necessary measures have been taken for the alleviation of the turn-to-turn voltage share against a steep-fronted surge voltage. Two reasons are conceivable for this. One of the reasons is that a lightening surge and a switching surge are unlikely to directly enter the low-voltage rotating electric machine located in an electric power distribution system. The other reason is that since an enamel-insulated round wire is used to manufacture a coil for a winding conductor in a low-voltage rotating electric machine, this type of coil, unlike a preformed coil using a rectangular conductor, makes it difficult to control the capacitance between a turn and a core, and the capacitance between turns. In addition, in terms of space and reliability, the capacitor for adjusting the distributed capacitance between turns is difficult to connect midway on the winding.

In other words, conventional rotating electric machines have been increased in insulating dimensions, so without machine dimensional enlarging, it has been difficult to provide a rotating electric machine reliable enough against a steep-fronted surge voltage from an inverter.

Accordingly, the present invention has its object to provide a rotating electric machine, winding machine, rotating electric machine system, hybrid electric vehicle, fuel cell electric vehicle, and electric vehicle capable of being increased in inverter surge withstand voltage, even without being increased in insulating dimensions.

In order to solve the foregoing problems, a rotating electric machine of the present invention includes a stator core of a cylindrical shape, a rotor core coaxially rotating inside the stator core, and a plurality of coils each formed by winding magnet wires using a slot formed axially in either the stator core or the rotor core, or both thereof. In the rotating electric machine: each of the coils is split into a plurality of coil groups; starting sections of winding of the magnet wires in one of the coil groups are wound together with (adjacently to) ending sections of winding of the magnet wires in another of the coil groups; and the starting sections and ending sections of winding of the magnet wires in the two coil groups are connected at respective outgoing wire ends to one another, outside the slots.

That is to say, since the first winding turn of one magnet wire and the last winding turn of another magnet wire are adjacent to each other, capacitance occurs between the magnet wires. Additionally, since the starting sections of winding of the magnet wires in the two coil groups and the ending sections of winding of the magnet wires in the two coil groups are connected at the respective outgoing wire ends to one another outside the slots, a connection point between the interconnected wires is connected to an element having the generated capacitance, without being relayed via the coils. Thus, a surge voltage applied to the connection point is passed via the capacitance without being relayed via coil inductance elements of one coil group or another. A surge withstand voltage, therefore, increases without an increase in voltage between turns of the coil.

According to the present invention, it is possible to provide a rotating electric machine, winding machine, rotating electric machine system, hybrid electric vehicle, fuel cell electric vehicle, and electric vehicle capable of being increased in surge withstand voltage.

BRIEF DESCRIPTION OF THE DRAWINGS

FIG. 1 is a block diagram of a rotating electric machine system which is a first embodiment of the present invention;

FIG. 6 is a diagram that shows winding process steps for a stator coil of the distributed-winding scheme;

DESCRIPTION OF THE PREFERRED EMBODIMENTS

First Embodiment

Figure 2A:
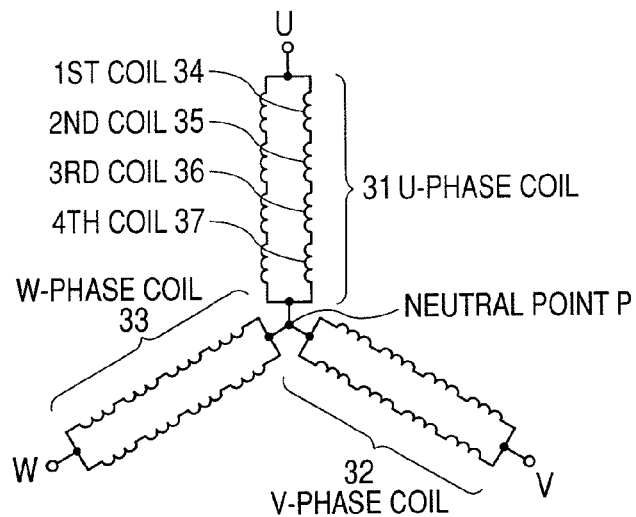
FIG. 2A is a circuit diagram of Y-connected coils of a distributed-winding scheme in the first embodiment.

An inverter-driven, rotating electric machine system that is a first embodiment of the present invention is described as below referring to FIG. 1. The rotating electric machine system 200 includes a rotating electric machine 100, an inverter power supply 11, and a cable 18 for connecting the rotating electric machine 100 and the inverter power supply 11. A torque of the rotating electric machine 100 drives a load 9.

The inverter power supply 11 includes a converter 12 for converting an alternating-current (AC) voltage into a direct-current (DC) voltage, a smoothing capacitor 13 for stabilizing the DC voltage, and an inverter circuit 14 for changing the DC voltage into a rectangular-wave AC voltage by switching with a switching element such as a field-effect transistor (FET) or insulated-gate bipolar transistor (IGBT). The smoothing capacitor 13 is connected between an upper arm 16 and a lower arm 17, and the lower arm 17 is electrically grounded.

The rotating electric machine 100 includes a stator 3 that uses a current to generate a rotating magnetic field, and a rotor 5 having a plurality of magnetic pole pieces and coaxially rotating inside the stator 3 by an interaction caused between the rotating magnetic field and the magnetic pole pieces. These constituent elements of the rotating electric machine 100 are accommodated in a housing 2. The rotor 5 is formed by a plurality of magnets each functioning as a magnetic pole piece near the surface of a rotor core 7. The stator 3 includes a stator core 20 and a stator coil 19 wound around the stator core 20, and is fixed to the housing 2 by using bolts 21. A shaft 8 fixed to the rotor 5 is supported by two bearings 6 mounted in the housing 2. For safety purposes, the housing 2 and the stator core 20 are directly grounded or grounded via a cable 18 through which electric power is supplied from the inverter power supply 11. The stator coil 19 is a distributed-winding type of Y-connected coil, as described later herein.

Figure 2B:
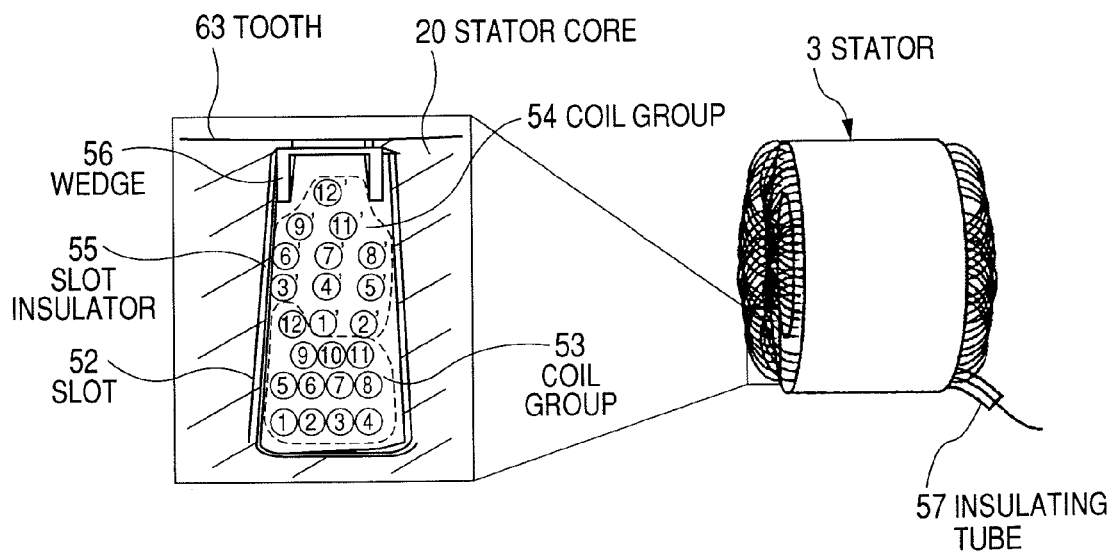
FIG. 2B is an external view of the coils.

FIG. 2A is a circuit diagram of the stator coil in the rotating electric machine 100. FIG. 2B is an external view of the stator 2, also showing a slot in partially enlarged form in cross section.

As shown in FIG. 2B, the stator coil of the rotating electric machine 100 is Y-connected. In the Y-connection, ending positions of winding of a U-phase coil 31, a V-phase coil 32, and a W-phase coil 33, are electrically connected to one another at a neutral point P, and phase voltages U, V, W are applied to starting positions of winding of the phase coils. Each phase coil is formed by four series-connected coils per phase, namely, a first coil 34, a second coil 35, a third coil 36, and a fourth coil 37, and two such sets of series coils are connected in parallel to each other.

As shown in FIG. 2B, the stator core 20 in the stator 3 is constructed so that a plurality of radial teeth 63 projecting in a central direction of the stator core are formed at equal circumferential angle pitches in a perpendicular plane of a rotating shaft of the rotor 5, and so that a slot 52 is formed in each interstice between the teeth. Also, a slot-insulating member 55 is placed on the surface of the slot 52, and a wedge 56 is provided as an insulator in the interstice between the teeth 63.

Two coil groups, 53 and 54, that are wound coils are housed in the slot 52. Magnet wires in the coil groups 53, 54 are connected to each other at respective starting sections of winding and at respective ending sections of winding, and the magnet wires are each formed as a single-layer-wound coil using a dual-wire conductor. In this example, the coil is manufactured by winding two wires through 12 turns each around one conductor.

The magnet wires are wound into distributed-winding form using two slots 52 formed across at least one slot, and the wires form the coil groups 53 and 54. The coil group 53 is formed by winding a magnet wire sequentially from a starting turn (1) of winding in depths of a slot to an ending turn (12) of winding. After this, the coil group 54 is formed by winding a magnet wire initially with a starting turn (1') of winding positioned adjacently to the ending turn (12) of winding in the coil group 53, and continuing the winding operation until an ending turn (12') of winding has been obtained. If the magnet wires going out from each stator coil are to have an insulating tube outside the slots, the magnet wires going out from different positions in the slots are each covered with an independent insulating tube 57 such as an insulating glass tube, or these magnet wires are integrated into a single wire and covered with a similar or equivalent insulating tube 57.

Figure 3A:
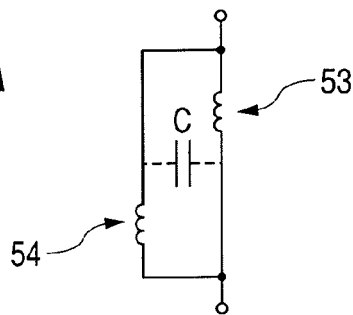
FIG. 3A is an equivalent circuit diagram of the coils.

FIG. 3A is an equivalent circuit with the coils of the coil groups 53, 54 connected to each other. In this circuit composition, the magnet wires in the coil groups 53, 54 are interconnected at the respective starting sections of winding and at the respective ending sections of winding, and the starting sections of winding and the ending sections of winding are adjacent to each other. A capacitance element C is therefore created. An outgoing line is connected in parallel to the coil groups 53, 54 each. This represents non-adjacent layout of the coil groups, except at the starting and ending sections of winding of the magnet wires. A surge voltage, even if applied between turns, will be absorbed by the capacitance element C, and a voltage between turns will gradually increase according to a normal voltage applied, other than the surge voltage.

Figure 3B:
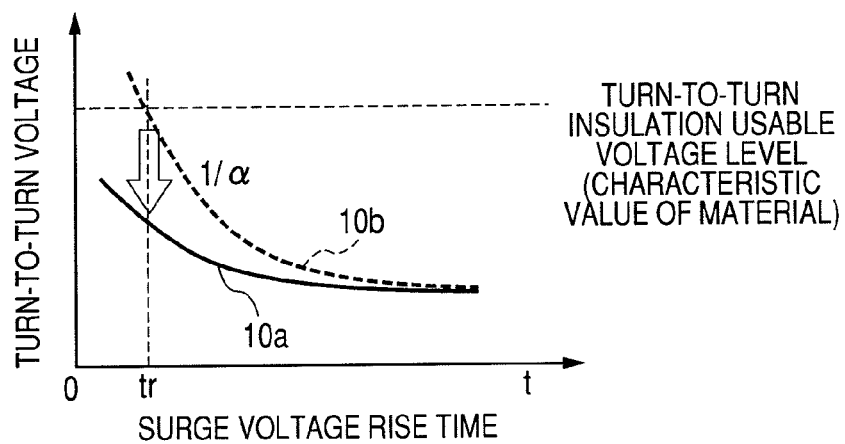
FIG. 3B is a diagram of turn-to-turn voltages.
Figure 3C:
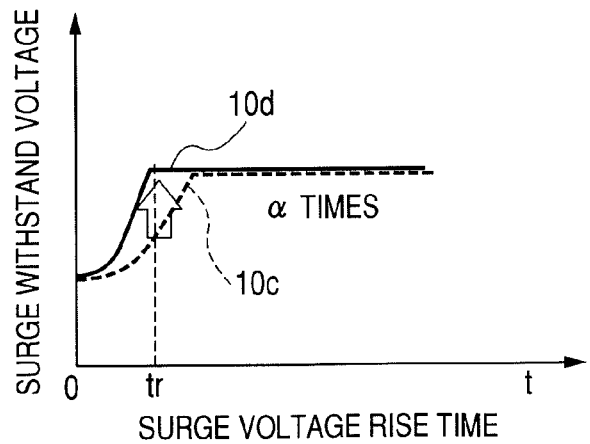
FIG. 3C is a diagram of surge withstand voltages.

FIG. 3B shows turn-to-turn voltage characteristics with respect to a rise time of a surge voltage. FIG. 3C shows surge withstand voltage characteristics of a motor with respect to a rise time of another surge voltage. A vertical axis in FIG. 3B denotes changes in turn-to-turn voltage, and a horizontal axis denotes changes in the rise time of the surge voltage. A turn-to-turn voltage 10a applies to using the coils of the present embodiment, and a turn-to-turn voltage 10b applies to using the coils shown in a first comparative example described later herein. The first comparative example apply to a case in which two magnet wires are wound in parallel in the slot 52 from the respective starting sections of winding to the respective ending sections of winding, as shown in FIG. 2A, and the two outgoing lines at the starting sections of winding and the two outgoing lines at the ending sections of winding are connected outside the slot.

In a rotating electric machine of the first comparative example described later herein, the turn-to-turn voltage 10b has abruptly increased with respect to such a surge voltage as shown in the first comparative example, and has been liable to equal or exceed a usable voltage level of the turn-to-turn insulation. In the rotating electric machine 100 of the present embodiment, however, even if the rise time of the surge voltage becomes shorter, the turn-to-turn voltage 10a increases gently, so the turn-to-turn voltage can be reduced with respect to the usable voltage level of the turn-to-turn insulation. The usable voltage level of the turn-to-turn insulation is a characteristic value of its material. Since the turn-to-turn voltage can be reduced, it is possible to provide an inverter-driven, rotating electric machine system highly reliable at a great safety ratio, even against unpredictable voltage changes such as transient changes in a power supply bus voltage of the inverter power supply 11. At the same surge voltage rise time "tr", when the since the turn-to-turn voltage 10a in the present embodiment can be reduced to $1/\alpha$ with respect to the turn-to-turn voltage 10b, the inverter surge withstand voltage and inverter system voltage of the rotating electric machine 100 can be enhanced by a factor of a when considered at a safety ratio equivalent to that of the first comparative example. The rotating electric machine 100 in the inverter-driven rotating electric machine system of the present embodiment is constructed such that the turn-to-turn voltage occurring when a steep-fronted surge voltage is applied from the inverter will be lower than the usable voltage level of the turn-to-turn insulation in the first comparative example. In other words, the turn-to-turn surge voltage of the rotating electric machine 100 decreases below the turn-to-turn surge voltage occurring when the steep-fronted surge voltage is applied to the parallel coils having two magnet wires wound in parallel in the slot 52. In addition, the particular turn-to-turn surge voltage is preferably controlled to be equal to or less than a partial discharge inception voltage of the turn-to-turn insulation or to be equal to or less than a voltage at which the turn-to-turn insulation suffers dielectric breakdown after a required time has elapsed.

In FIG. 3C representing a relationship between the present embodiment and the first comparative example, a horizontal axis denotes a rise time of a surge voltage and a vertical axis denotes the surge voltage. In the first comparative example, when the rise time of the surge voltage becomes short, the turn-to-turn voltage correspondingly increases and the inverter surge withstand voltage abruptly decreases. However, since the turn-to-turn voltage of the rotating electric machine 100 in the present embodiment gently increases, the inverter surge withstand voltage 10d of the rotating electric machine 100 also decreases gently. Accordingly, the inverter surge withstand voltage of the rotating electric machine 100 in the present embodiment increases in comparison with that of the first comparative example. This increase rate becomes a ratio of the turn-to-turn voltage occurring when the steep-fronted surge voltage is applied, so the increase rate consequently becomes $\alpha$ times higher. Using the system configuration of the present embodiment, therefore, makes it possible to enhance the inverter surge withstand voltage of the rotating electric machine 100. This, in turn, makes it possible to provide the rotating electric machine system 200 driven by an inverter of high output density.

Figure 4A:
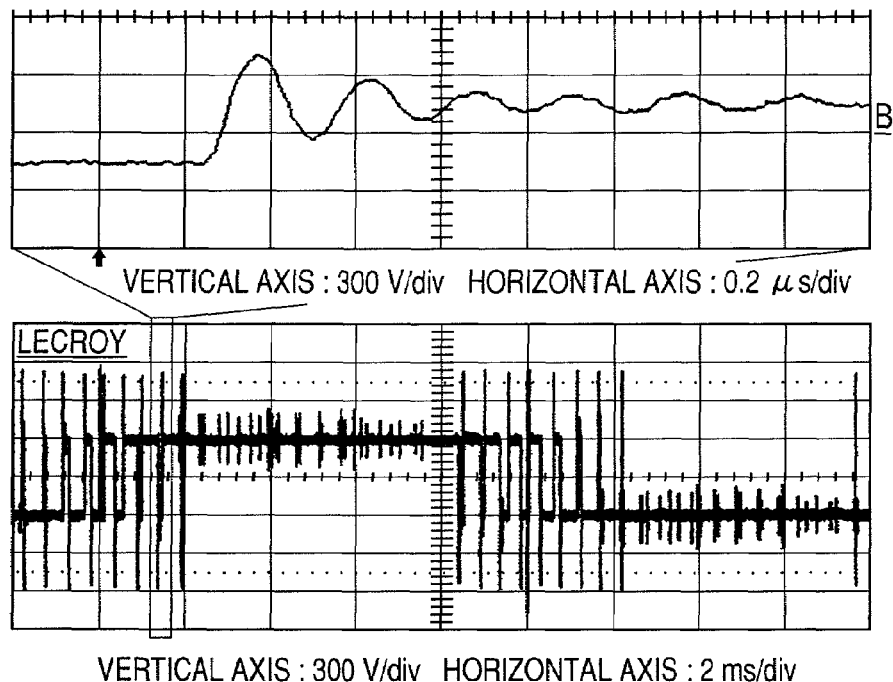
FIG. 4A is a diagram of a surge voltage waveform.

FIG. 4A shows examples of surge voltage data measurements. A vertical axis is represented on a scale of 300 V/div and a horizontal axis is represented on scales of 0.2 μs/div and 2 ms/div, the representation of the measurement example in 0.2 μs/div being a partial enlarged view of the representation of the measurement example in 2 ms/div. A surge voltage of a field is shown as a pulse-like voltage waveform having a steep voltage change of about 0.1 μs for the rise time "tr".

Figure 4B:
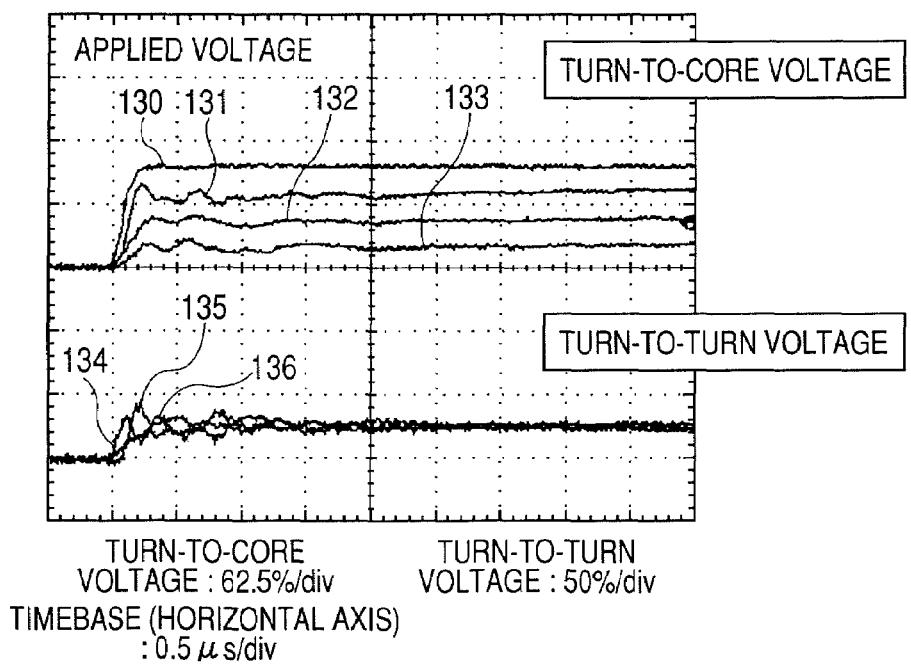
FIG. 4B is a diagram of turn-to-core voltage characteristics and a diagram of turn-to-turn voltage characteristics.

FIG. 4B shows measurement results on the turn-to-turn voltages occurring when a steep-fronted surge voltage is applied to each of the U-phase coil 31, V-phase coil 32, and W-phase coil 33 of the rotating electric machine 100, shown in FIG. 2A. Vertical axes use a scale of 62.5%/div for turn-to-core voltages and a scale of 50%/div for the turn-to-turn voltages. A horizontal axis uses a scale of 0.5 μs/div. Applied voltage 130 is the turn-to-core voltage of a lead wire turn of the first coil. Turn-to-core voltages 131-133 are measured voltages of lead wire turns of the second to fourth coils, respectively. Differences between these voltages are the turn-to-turn voltages of each coil, and turn-to-turn voltages 134-136 are the turn-to-turn voltages of the first to third coils, respectively. In FIG. 4B, both the turn-to-core voltages and the turn-to-turn voltages are shown with applied voltage variations as 100%. In the present embodiment, the turn-to-turn voltages 134-136 of the first to third coils, respectively, exhibit essentially the same crest value, even for a steep-fronted surge voltage associated with a rise time of about 0.1 μs, and no increases in the turn-to-turn voltages are observed, even for the steep-fronted surge voltage.

(Manufacturing Process)

Figure 5:
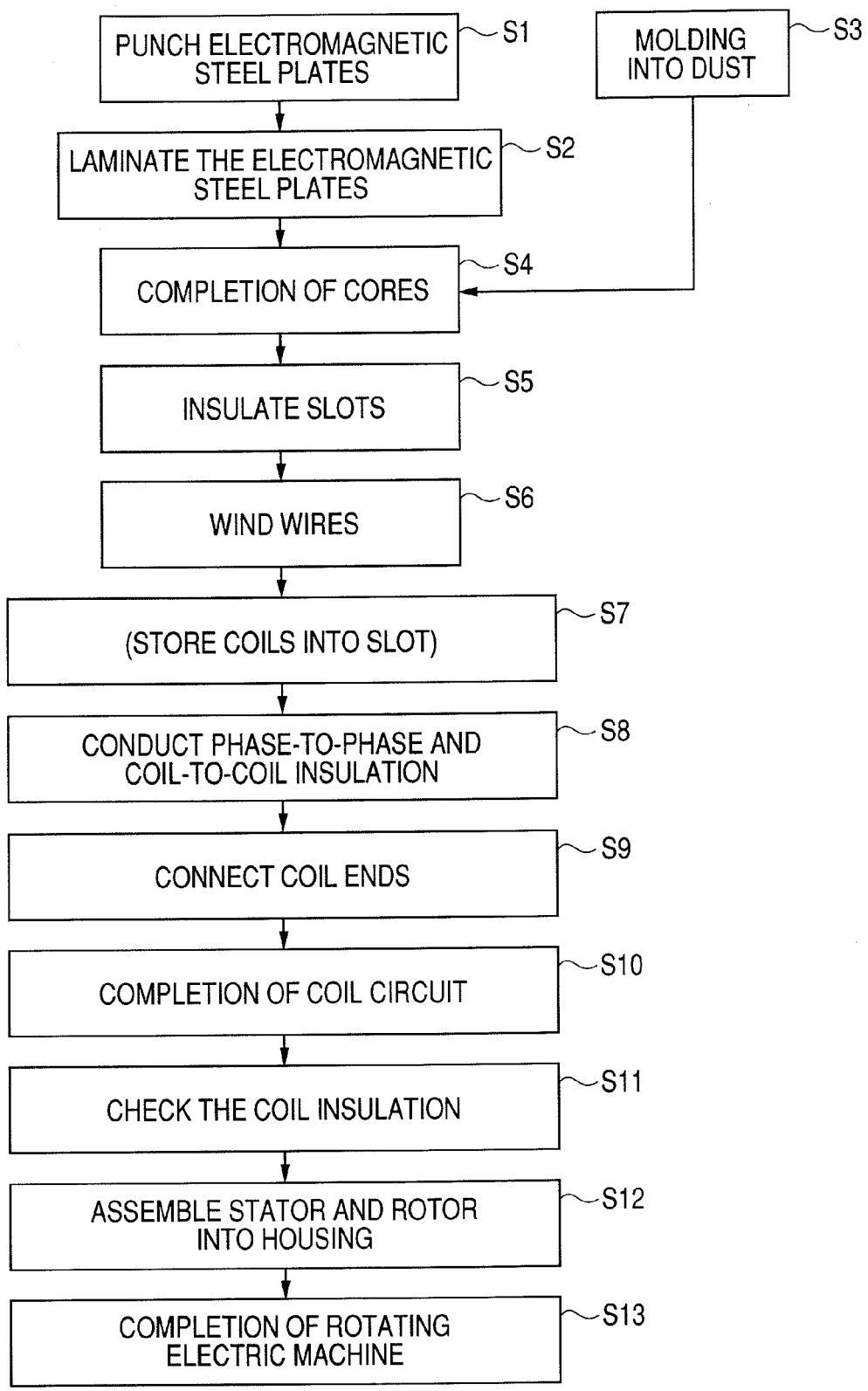
FIG. 5 is a diagram that shows manufacturing process steps for a rotating electric machine.

FIG. 5 is a diagram showing a manufacturing method for the rotating electric machine 100 in the present embodiment. First, electromagnetic steel plates are punched (step S1), which are then laminated (step S2) or magnetic powder is molded into dust form by compression molding (step S3). A core to serve as the stator core 20 is thus completed (step S4). Next, slots 52 in the stator core 20 are each provided with a slot insulator 55 as shown in FIG. 2A, and the slots are insulated (step S5). Magnet wires are wound through a required number of turns around the stator core 20 with the slot insulators 55 (step S6), and these windings are stored into each slot (step S7).

Additionally, in an entire overhang region from the slot 52 to both axial ends of the stator core 20, a section at which windings different in phase voltage are provided with phase-to-phase coil insulation, and a section at which a line-side high-voltage winding and an internal low-voltage winding, even if both windings are of the same phase, are provided with coil-to-coil insulation (step S8). Ends of the coils which have gone through these insulating operations are connected using a method such as welding, thermal caulking, soldering, or brazing (step S9). This completes, for example, a Y- or Δ-coil circuit (step S10). Next, the manufactured coils are insulation-checked (step S11), and if the insulation is nondefective, the stator 3 and the rotor 5 are assembled into the housing 2 (step S12), whereby the rotating electric machine 100 is completed (step S13).

(Other Winding Operations)

In step S6 of FIG. 5, magnet wires were wound directly around the teeth 63 (see FIG. 2A) of the stator core 20. Instead, however, previously wound coils can be inserted into the stator core 20.

FIG. 6 shows another example of winding operations for the rotating electric machine 100 of the distributed-winding scheme. This winding process consists of three steps from S21 to S23. A reel 70 and bobbins 71, 72 constitute a winding machine. First, one ends of magnet wires are taken out from the bobbins 71, 72 and wound around the reel 70 (step S21). First in this winding step, the magnet wire that has been taken out from the bobbin 71 is wound through a required number of turns (e.g., 12 turns) to form the coil group 53. Next when this winding operation is completed, the magnet wire that has been taken out from the bobbin 72 is wound through the required number of turns from a position adjacent to the ending position of the above winding operation. The coil group 54 is thus formed. The reel 70 is appropriately grooved to suit a diameter of the magnet wires, and the magnet wires are wound along the groove. The reel 70 also has a position detection mark at the ending position of winding of the coil group 53 or at the starting position of winding of the coil group 54. Thus, the end of winding of the coil group 53 is easily detected.

After the above, the coil groups 53, 54 are inserted into a blade 76 from above (step S22). This is repeated twice to manufacture coils 77, 78, and the thus-manufactured coils 77, 78 are inserted into the stator core 20 (step S23). In this winding method, since distributed-winding-type coils of the same composition are formed, increases in turn-to-turn voltage against steep-fronted surge voltages are suppressed and this, in turn, also makes it possible to provide the rotating electric machine 100 excellent in inverter surge withstand voltage. While, in the relevant drawing, the bobbins 71, 72 are fixed and the reel 70 is rotated, the coil groups 53, 54 can likewise be formed by performing the winding operations with the reel 70 fixed and the bobbins 71, 72 rotated.

As described above, in the rotating electric machine 100 of the present embodiment, since the magnet wire whose starting turn of winding in the coil group 53 wound around the stator 3, and the magnet wire whose ending turn of winding in the coil group 54 are adjacent to each other, a capacitance element C is created between the magnet wires. In addition, since the outgoing line of the starting turn of winding and the outgoing line of the ending turn of winding are connected outside the above slot, a connection point P at which the outgoing lines have been connected to each other is connected to the created capacitance element C without being replayed via the coils. Thus, the surge voltage applied to the capacitance element C will be passed therethrough without being relayed via the coils. The surge voltage, therefore, is not applied to the coils.

Thus, the turn-to-turn voltage can be reduced using an easily bendable round wire, instead of a rectangular conductor that makes it easy to control the capacitance distributed between turns, and the turn-to-core capacitance distributed between various sections of the coil. The surge withstand voltage can be improved by reducing the turn-to-turn voltage. More specifically, the surge voltage can be reduced below the partial discharge inception voltage or below a voltage at which the insulation between turns suffers no dielectric breakdown for at least a required period of time. Additionally, according to the present embodiment, since an external capacitor does not need to be provided without strengthening the insulation, the surge withstand voltage can be improved without increasing the insulating dimensions or without dimensionally enlarging the rotating electric machine. For these reasons, the rotating electric machine system 200 is realizable that saves energy and is required to be more reliable than a sine-wave driving circuit. Furthermore, the cable 18 can be reduced in diameter since the DC voltage of the inverter power supply 11 can be enhanced and since the current supplied to the rotating electric machine 100 can be reduced.

Second Embodiment

Although the above embodiment has related to the stator coil of the distributed winding scheme, a stator coil of a concentrated winding scheme can be used instead.

Figure 7A:
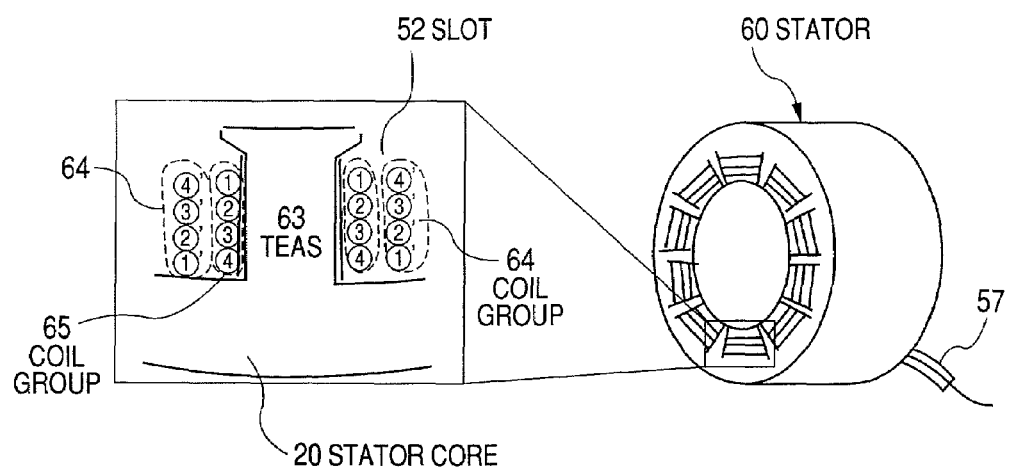
FIG. 7A is an external view of coils of the distributed-winding scheme in a second embodiment.

FIG. 7A is an external view of a stator in a rotating electric machine in a second embodiment, and is also a partial enlarged sectional view of a slot. A stator core of the stator 60 is the same as the stator core 20 of FIG. 2A in both shape and material. In the present (second) embodiment relating to concentrated winding, the slot insulator 55 in FIG. 2B is replaced by a bobbin. The stator 60 is formed by winding a coil group 65 through four turns, (1) to (4), around a tooth 63, then disposing a starting turn (1') of winding of next coil group 64 at a peripheral position of the ending turn (4) of winding of the coil group 65, and winding the coil group 64 through the remaining number of turns up to the ending turn (4').

The starting section and ending section of one of the coil groups 64, 65 are connected to the starting section and ending section of the other coil group, outside the slot 52, and four-turn coils of a dual-line conductor are thus formed. In the concentrated-winding type of rotating electric machine of the present embodiment, as in the distributed-winding type of rotating electric machine 100, since the starting turn (1') of winding of the next coil group 64 is disposed at a section adjacent to the ending turn (4) of winding of the coil group 65, so a capacitance element is created at this adjacent section. A surge voltage is discharged via the capacitance element, and the surge voltage is prevented from being applied between the coils.

In the present embodiment, therefore, increases in turn-to-turn voltage against steep-fronted surge voltages are also suppressed and this, in turn, makes it possible to provide a rotating electric machine excellent in inverter surge withstand voltage. If outgoing magnet wires from the coils wound around the tooth 63 are to have an insulating tube 57, the magnet wires going out from different positions on the tooth may each be covered with an independent insulating tube 57 or these magnet wires may be integrated into a single wire and covered with the insulating tube.

Figure 7B:
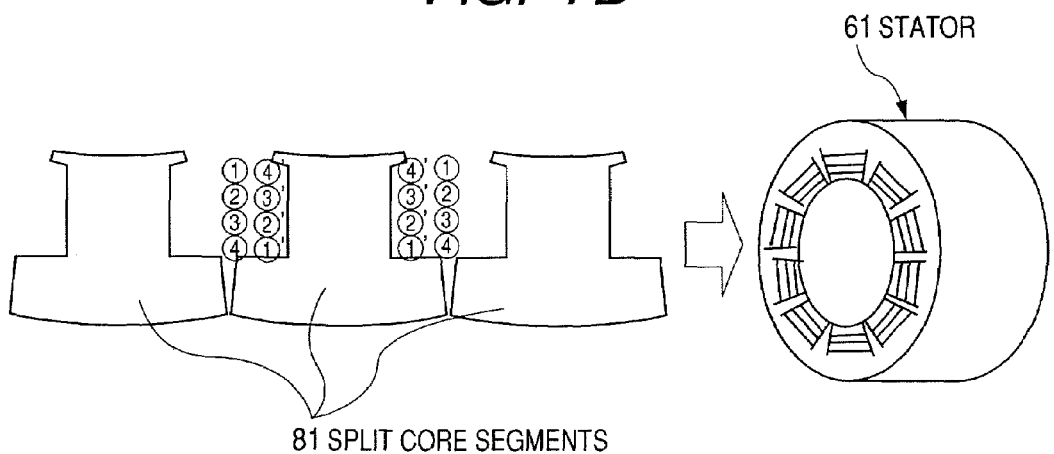
FIG. 7B is a diagram showing a manufacturing method which uses a split core.

FIG. 7B shows another example of a stator of the concentrated-winding type. The stator 61 not using an integrated stator core includes a split core 81 split into a plurality of segments, and a stator coil wound around teeth of the split core 81. However, after winding the coil around the split core, combining these constituent elements constitutes a rotating electric machine capable of yielding similar/equivalent advantageous effects. While the split-core type of stator in the relevant drawing is of the concentrated-winding scheme, a distributed-winding scheme with the split core can also yield similar/equivalent advantageous effects.

FIRST COMPARATIVE EXAMPLE

Figure 8A:
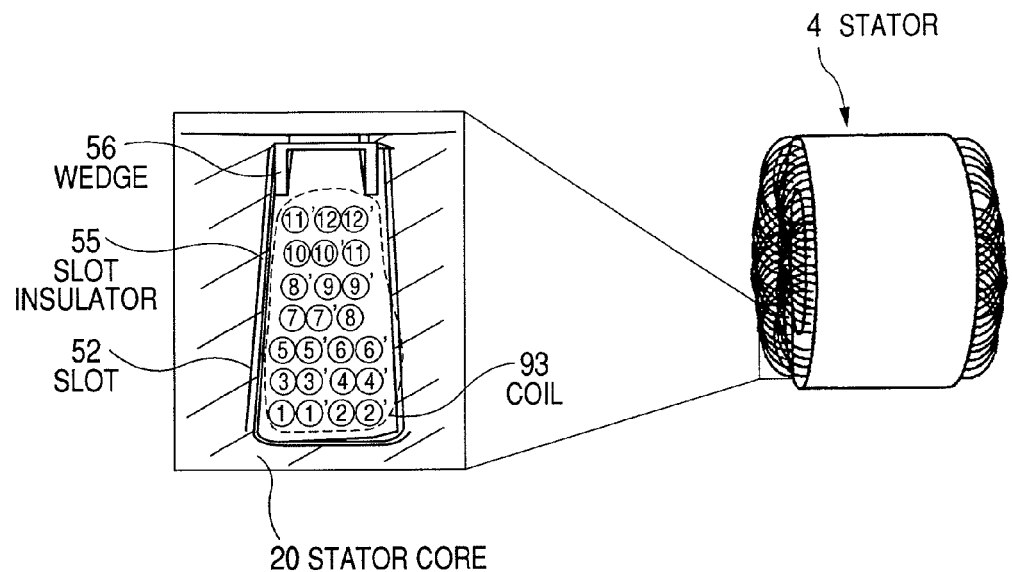
FIG. 8A is an external view of coils of the distributed-winding scheme in a first comparative example.

FIG. 8A is an external view of a distributed-winding type of stator which is a first comparative example, and is also a partial enlarged sectional view of a slot. In the first comparative example, two parallel magnet wires are wound around a stator core from a starting position of winding to an ending position of winding, and the starting section and ending section of winding of one of the magnet wires are connected to the starting section and ending section of winding, respectively, of the other magnet wire, outside the slot. As in FIG. 2A, the slot 52 in the stator core 20 has a slot insulator 55 and a wedge 56, and a coil 93 is accommodated within the slot 52. The coil 93 is a single-layer-wound coil of a dual-line conductor, and winding through 12 turns forms one coil. Connections are established between outgoing lines formed by the starting turns (1) (1') of winding, and between outgoing lines formed by the ending turns (12) (12') of winding. This comparative example, however, differs from the first embodiment in that the two entire magnet wires are made parallel to each other.

In the first comparative example, during magnet wire winding around the stator core 20, the stator coil is manufactured by taking one ends of the magnet wires out from two different bobbins and then winding each wire adjacently from depths of the slot, through 12 turns from the starting turn (1), (1') of winding to the ending turn (12), (12') of winding. In the first comparative example, as in the first embodiment, four coils, although not shown, are connected in series to form the stator coil. As described in the first embodiment, a turn-to-turn voltage essentially of the same level as a usable voltage level of enamel-insulated magnet wires occurs in the first comparative example.

Figure 8B:
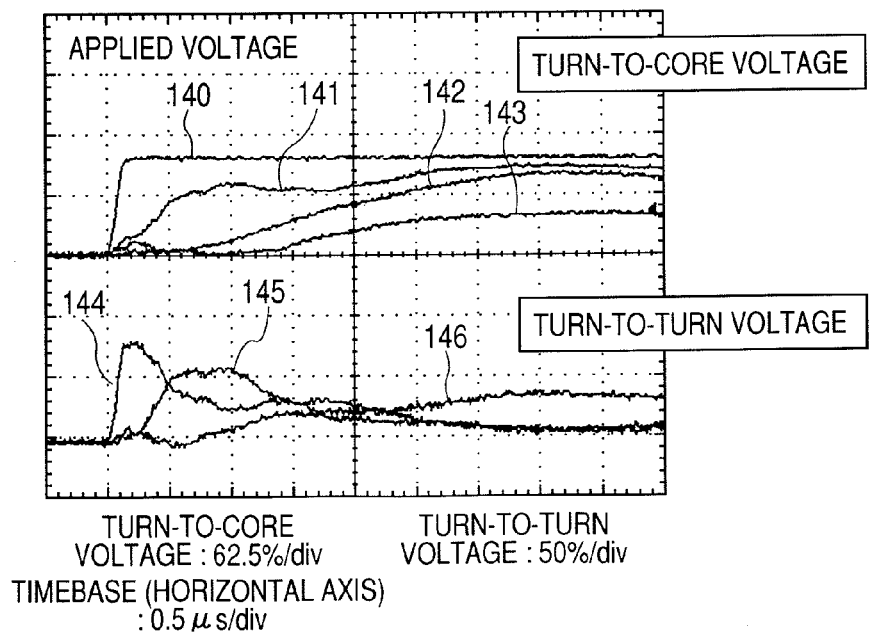
FIG. 8B is a diagram that shows turn-to-core voltage characteristics and turn-to-turn voltage characteristics.

FIG. 8B shows turn-to-turn voltage measurement results on a rotating electric machine used in the first comparative example. Vertical axes use a scale of 62.5%/div for turn-to-core voltages and a scale of 50%/div for the turn-to-turn voltages. A horizontal axis uses a time base scale of 0.5 µs/div. Applied voltage 140 is a turn-to-core voltage applied to a lead wire turn of the first coil. Turn-to-core voltages 141-143 are measured voltages of lead wire turns of the second to fourth coils, respectively. Differences between these voltages are the turn-to-turn voltages of the coil 93 shown in FIG. 8A, and turn-to-turn voltages 144-146 are the respective turn-to-turn voltages of the first to third coils shown in FIG. 3A. In the rotating electric machine of the first comparative example, the lead wire voltage (turn-to-core voltage 142) of the second coil 35 reaches a peak with a delay of 0.5-1.0 µs after the applied voltage 140 has reached a peak. Consequently, the turn-to-turn voltage 144 of the first coil 34 that is the difference between the applied voltage 140 and the turn-to-core voltage 141 is of much the same level as that of the applied voltage 140. As described above, in the rotating electric machine of the first comparative example, high turn-to-turn voltages occur for steep-fronted surge voltages.

Figure 9A:
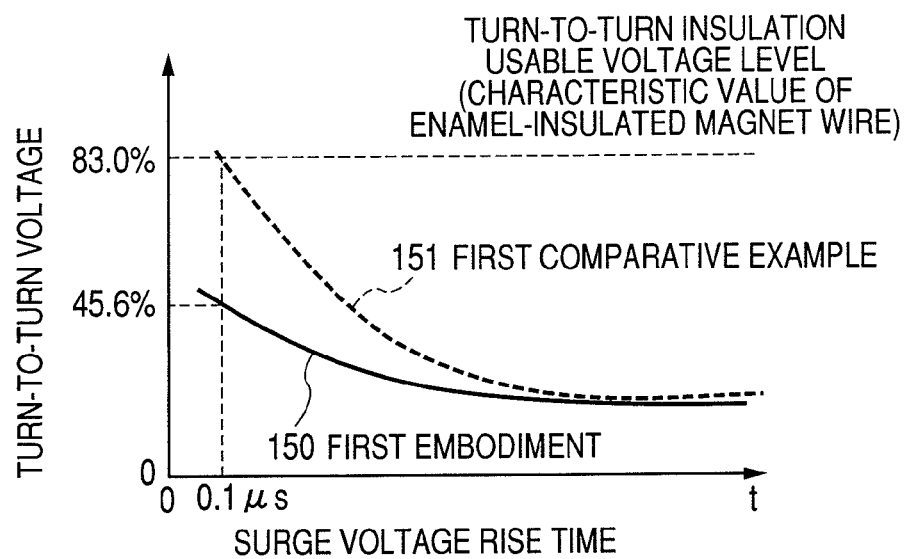
FIG. 9A is a diagram that shows turn-to-turn voltage characteristics of a coil of the distributed-winding scheme in the first comparative example.

Turn-to-turn voltage measurement results in the first embodiment and those of the first comparative example are shown in FIG. 9A. At a steep-fronted surge voltage of 0.1 µs, a turn-to-turn voltage 150 in the first comparative example reaches 83.0% of the surge voltage. In addition, this turn-to-turn voltage level agrees with the usable voltage level of the enamel-insulated magnet wires used for the measurements, and the agreement indicates that there is no margin on the safety ratio. In the first embodiment, however, a relative voltage level of a turn-to-turn voltage 151 with respect to the usable voltage level of the enamel-insulated magnet wires is 45.6%, which indicates that there is a sufficient margin for the usable voltage level. This usable voltage level of the enamel-insulated magnet wires is a characteristic value of the enamel-insulated wires. The rotating electric machine 100 in the first embodiment is excellent in inverter surge withstand voltage characteristics, improves in safety ratio, even in case of an unpredictable event such as voltage fluctuations, and has reliability as high as 83.0/45.6=1.82 times that achievable in the rotating electric machine of the first comparative example.

Figure 9B:
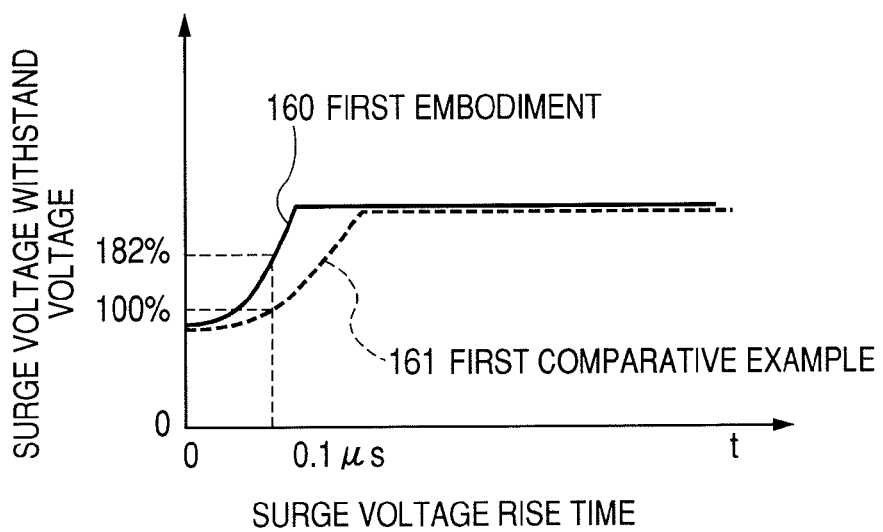
FIG. 9B is a diagram that shows surge withstand voltage characteristics.

Inverter surge withstand voltages of the rotating electric machines in the first embodiment and first comparative example, existing when both machines are constructed to be of the same reliability, are shown in FIG. 9B. An inverter surge withstand voltage 161 for a surge voltage rise time of 0.1 µs in the first comparative example is shown as 100% in the figure. An inverter surge withstand voltage 160 in the first embodiment is 83.0/45.6=1.82 times higher than the equivalent of the first comparative example in terms of a reciprocal of a turn-to-turn voltage decrement, so the first embodiment is considered to have an inverter surge withstand voltage of 182%. In the system of the first embodiment that uses the rotating electric machine 100, therefore, it is considered to be possible to increase an inverter system voltage as high as 1.82 times that of the first comparative example, and hence to obtain correspondingly high output density in the inverter-driven rotating electric machine system 200.

SECOND COMPARATIVE EXAMPLE

Figure 10A:
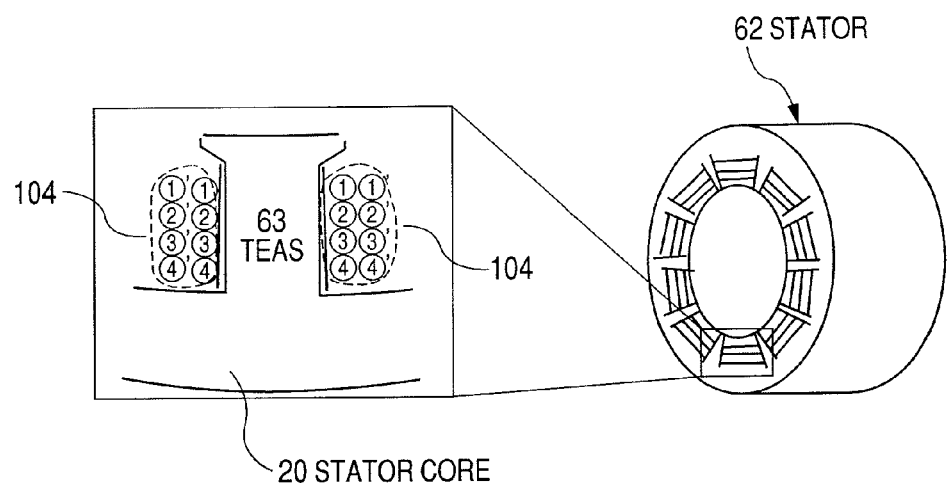
FIG. 10A is an external view of coils of a concentrated-winding scheme in a second comparative example.

FIG. 10A shows a concentrated-winding stator used in a second comparative example, and a partial enlarged sectional view of the stator. For the stator 62 in the second comparative example, four-turn coils 104 are each formed by, when a winding conductor is wound around teeth 63, taking magnet wires out from two different bobbins and then winding the wires adjacently from starting turns (1), (1') of winding in depths of the teeth, to ending turns (4), (4') of winding. High turn-to-turn voltages for steep-fronted surge voltages similar to those of the first comparative example also occur in a rotating electric machine of the second comparative example.

THIRD COMPARATIVE EXAMPLE

Figure 10B:
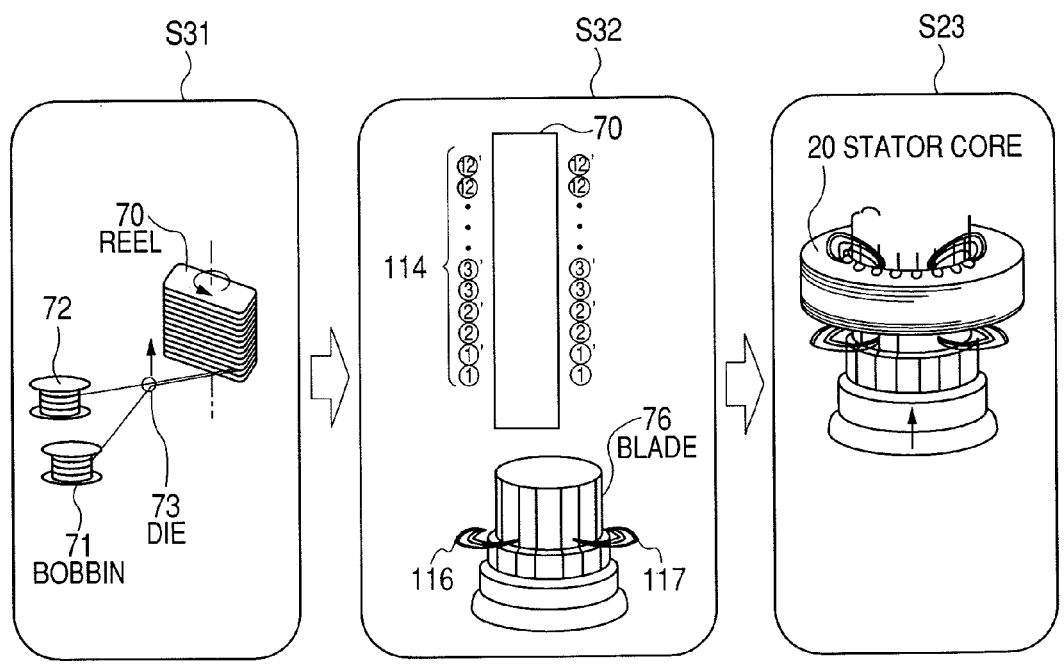
FIG. 10B is a diagram showing a manufacturing process for a stator.

FIG. 10B shows a winding process for a distributed-winding-type rotating electric machine of a third comparative example. In the first and second comparative examples, coils have been manufactured by winding magnet wires around the stator core 20 and the teeth 63, whereas, in the third comparative example, two magnet wires are taken out from bobbins 71, 72 and wound around a reel 70. Before being wound around the reel 70, the two magnet wires that have been taken out from the bobbins 71 and 72 are integrated into a single wire using a die 73 (step S31). The two integrated magnet wires are wound around the reel 70 to form a coil 114, which is then inserted into a blade 76 from above (step S32). This is repeated twice, then the coils 116, 117 that have thus been manufactured are inserted into a stator core 20, and a stator is manufactured (step S33). In this method, since essentially the same stator as used in the first or second comparative example is also manufactured, high turn-to-turn voltages occur for steep-fronted surge voltages.

As a result of the present invention, it becomes possible, just by changing the winding method, to provide a rotating electric machine that is reduced in turn-to-turn voltage for a particular steep-fronted surge voltage and has high anti-inverter surge reliability with dimensions equal to or less than conventional machine dimensions. An inverter-driven industrial rotating electric machine system of high output density can also be provided.

(Hybrid Electric Vehicle)

Figure 11:
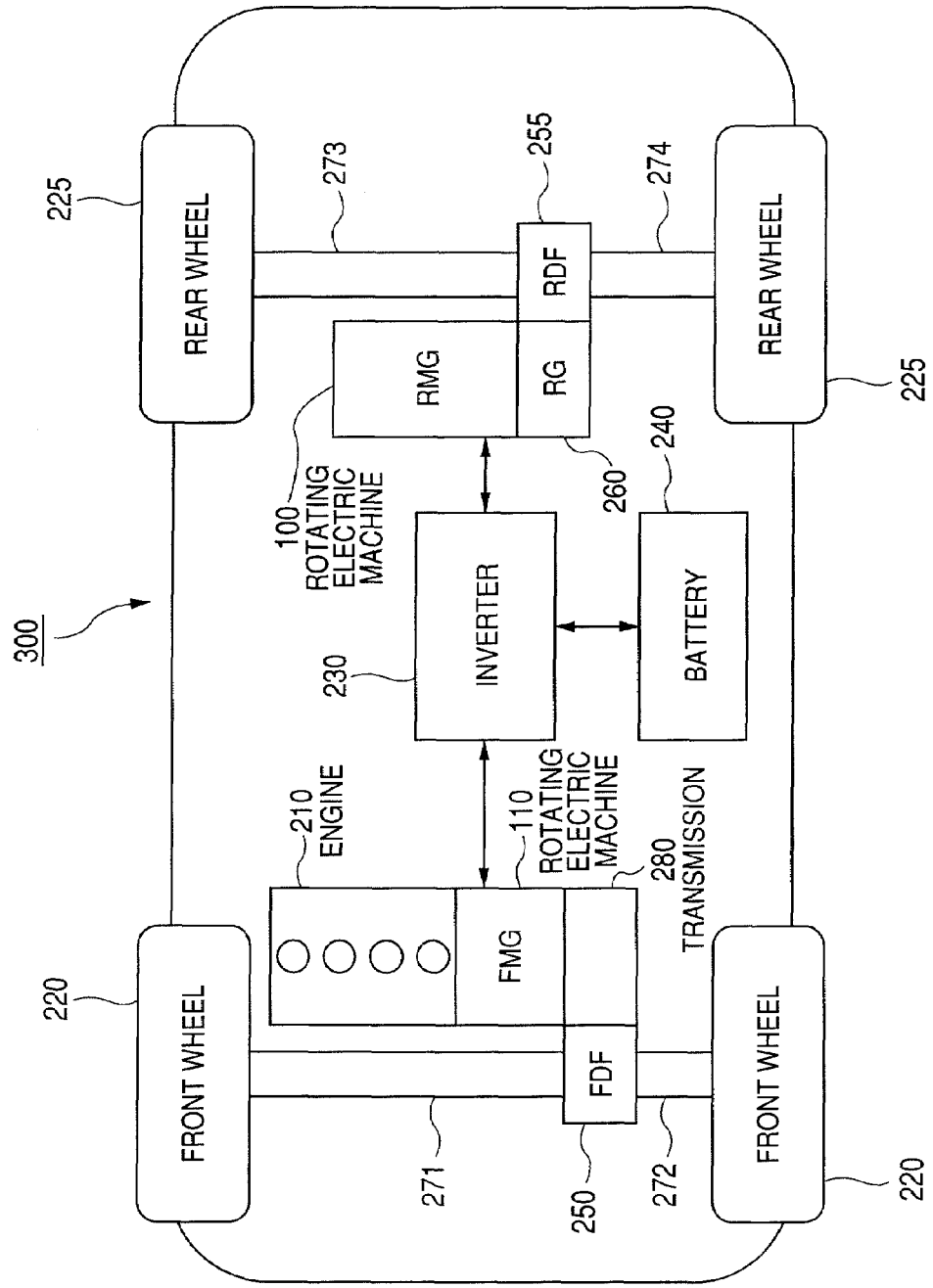
FIG. 11 is a block diagram of a hybrid electric vehicle.

Next, a hybrid electric vehicle using a rotating electric machine system 200 is described below using FIG. 11.

The hybrid electric vehicle 300 is a four-wheel-drive electric vehicle that uses an engine 210 as an internal combustion engine, and a rotating electric machine 110 as a front motor generator FMG, to drive two front wheels 220, and uses a rotating electric machine 100 as a rear motor generator RMG, to drive two rear wheels 225. The rotating electric machine 110 is of the same configuration as that of the rotating electric machine 100 in the above first embodiment. However, a rotating electric machine of a different configuration can be used instead.

The description below relates to a case in which the front wheels 220 are driven by the engine 210 and the rotating electric machine 110 which is the front motor generator FMG, and the rear wheels 225, by the rotating electric machine 100 that is the rear motor generator RMG. However, the rear wheels 225 may be driven by the engine 210 and the rotating electric machine 100 which is the rear motor generator FMG, and the front wheels 220, by the rotating electric machine 110 that is the front motor generator FMG.

A transmission 280 is mechanically connected to front-wheel axles 271, 272 of the front wheels 220 via a front-wheel differential (FDF) 250. The engine 210 and the rotating electric machine 110 are mechanically connected to the transmission 280 via an output controller (not shown). The output controller is a mechanism that undertakes control of rotation output synthesis and distribution. Stator coils of the rotating electric machines 100, 110, and an alternating-current (AC) side of an inverter (INV) 230 are electrically connected. Inverter power supply 230, an electric power converter that changes direct-current (DC) power into three-phase AC power, controls driving of the rotating electric machines 100, 110. A battery 240 is electrically connected to a DC side of the inverter power supply 230.

The rotating electric machine 100, the rear motor generator RMG, is mechanically connected to rear-wheel axles 273, 274 of the rear wheels 225 via a rear-wheel differential (RDF) 255 and a rear reduction gear (RG) 260. The inverter power supply 230 used in common for the front motor generator FMG and the rear motor generator RMG includes a motor generator MG inverter, an inverter for the front motor generator FMG, and a driving controller for driving the two inverters.

Under starting and low-speed driving conditions of the hybrid electric vehicle in driving speed zones that reduce running efficiency of the engine 210 (i.e., fuel efficiency), the rotating electric machine 110 that is the front motor generator FMG drives the front wheels 220, and the rotating electric machine 100 for the rear wheels 225 does not drive the rear wheels. The vehicle may be constructed so as to operate in four-wheel-drive mode by activating the rotating electric machines 100 and 110 to simultaneously drive the front wheels 220 and the rear wheels 225, respectively.

Direct-current (DC) power is supplied from the battery 240 to the inverter power supply 230, and the DC power is converted into three-phase AC power, which is then supplied to the stator coil of the rotating electric machine 110 which is the front motor generator FMG. Thus, the rotation output that the rotating electric machine 110 has generated is input to the transmission 280 via the output controller (not shown). The input rotation output is converted into a speed signal by the transmission 280. The speed signal is then distributed to left and right by the front differential 250, and the distributed speed signals are transmitted to the front-wheel axles 271 and 272. This rotationally drives the front wheels 220.

Under normal driving conditions of the hybrid electric vehicle 300, when the vehicle is driven on a dry road and in a driving speed zone high in engine running efficiency (i.e., high in fuel efficiency), the vehicle utilizes a rotation of the engine 210 to drive the front wheels 220. Additionally, when detection results on a charge state of the battery 240 indicate that the battery 240 requires recharging, the output controller distributes the rotation output of the engine 210 to the rotating electric machine 110, the front motor generator FMG. Thus, the rotating electric machine 100 operates as a power generator, and three-phase AC power is generated in the stator coil. The generated three-phase AC power is converted into required DC power by the inverter power supply 230. The DC power that has thus been obtained by the conversion is stored into the battery 240.

Under driving conditions of the hybrid electric vehicle 300 in four-wheel-drive mode, when the vehicle is driven on a low-μ road and in a driving speed zone high in engine running efficiency (i.e., high in fuel efficiency), the rotating electric machine 100 drives the rear wheels 225, and as in driving under the above normal conditions, the engine 210 drives the front wheels 220. Additionally, since the amount of electricity stored within the battery 240 is reduced by the driving of the rotating electric machine 100, the rotating electric machine 110 is actuated by regenerative driving with the rotation output of the engine 210, as in driving under the normal conditions. The battery 240 is thus recharged.

Direct-current power is supplied from the battery 240 to the inverter power supply 230 in order to drive the rear wheels 225 by means of the rotating electric machine 100. The supplied DC power is converted into three-phase AC power by the inverter power supply 230, and the thus-obtained AC power is then used for driving by the rotating electric machine 100. The driving force obtained at this time rotationally drives the rear wheels 225 via the rear reduction gear (RG) 260, the rear-wheel differential (RDF) 255, and the rear-wheel axles 273, 274.

During acceleration of the hybrid electric vehicle 300, the engine 210 and the rotating electric machine 110 drive the front wheels 220. Rotation outputs of the engine 210 and the rotating electric machine 110 are input to the transmission 280 via the output controller. The input rotation outputs rotationally drive the front wheels 220 via the front-wheel differential (FDF) 250 and the front-wheel axles 271, 272.

During regenerative braking of the hybrid electric vehicle 300, when a brake pedal is stepped and a foot pressure on accelerator pedal is reduced or when accelerator pedaling is stopped for deceleration, rotational outputs of the front wheels 220 are transmitted to the rotating electric machine 110 via the front-wheel axles 271, 272, the front-wheel differential (FDF) 250, the transmission 280, and the output controller (not shown in the figure).

Also, rotational outputs of the rear wheels 225 are transmitted to the rotating electric machine 100 via the rear-wheel axles 273, 274, the rear-wheel differential (RDF) 255, and the reduction gear (RG) 260. The rotating electric machine 100, 110 then operates as the power generator. Three-phase AC power that the rotating electric machine 100, 110 has generated is supplied to the battery 240 via the inverter power supply 230, and the battery 240 is recharged.

Figure 12:
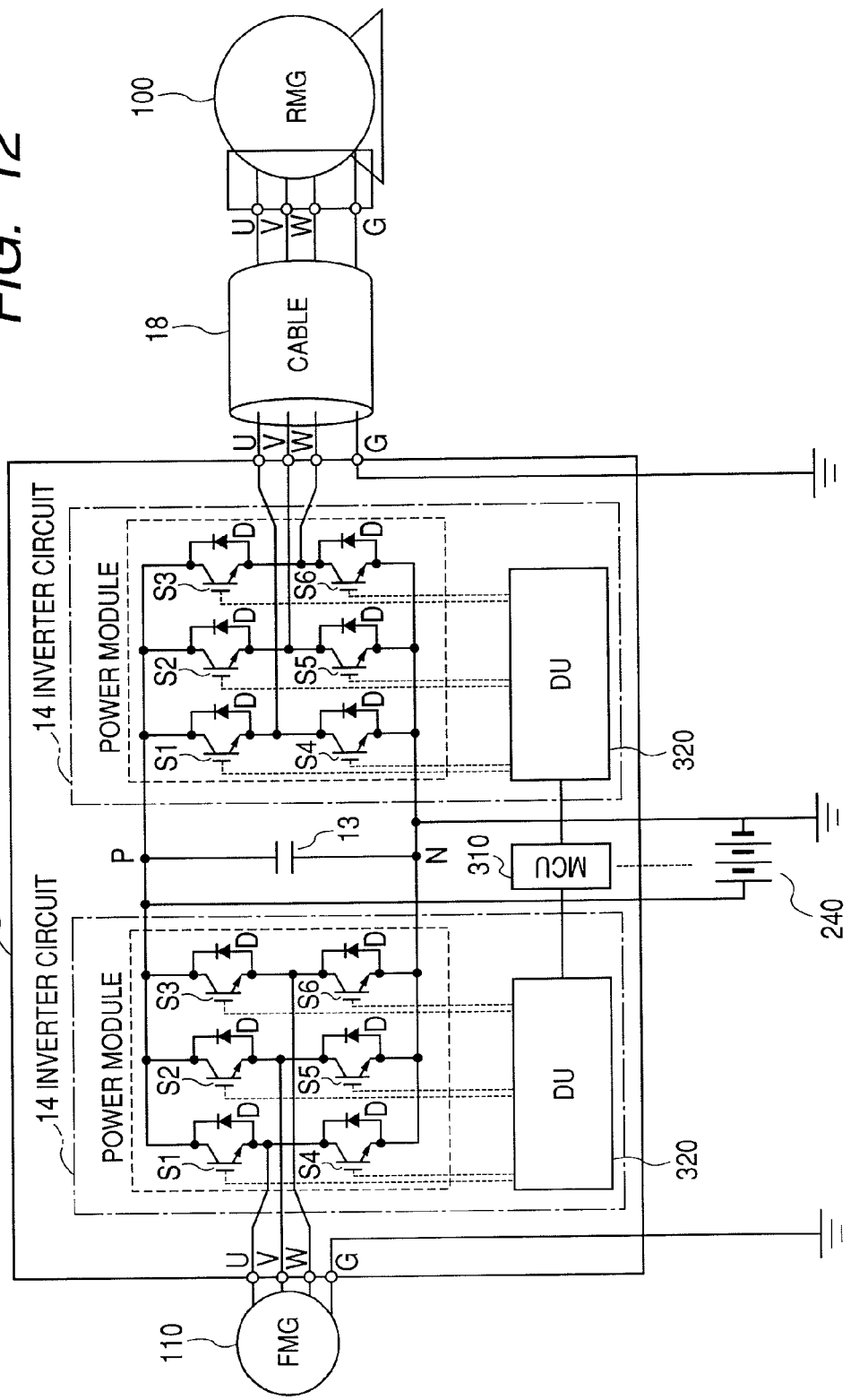
FIG. 12 is a block diagram of a rotating electric machine system used in the hybrid electric vehicle.
Figure 13A:
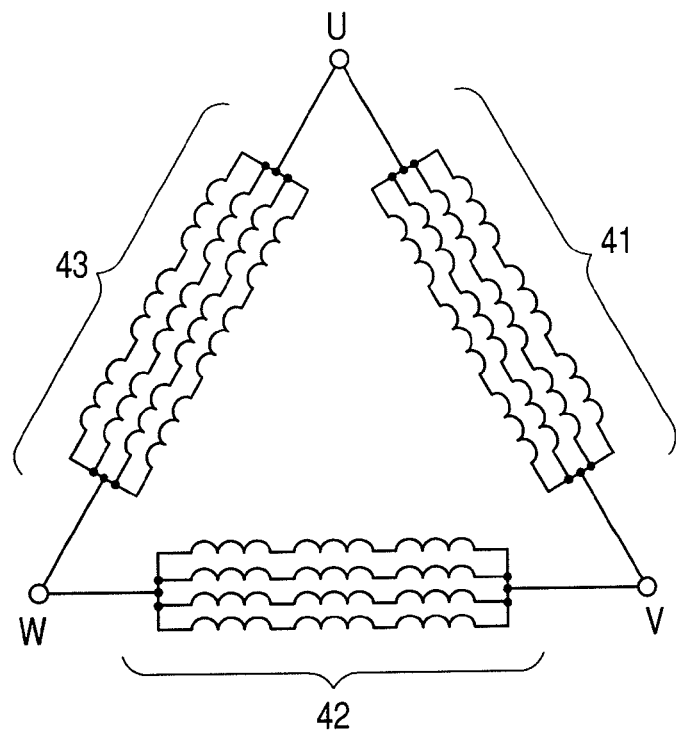
FIG. 13A is a Δ-connection diagram.
Figure 13B:
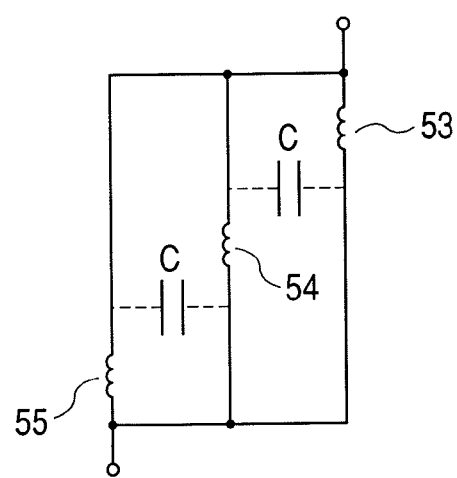
FIG. 13B is an equivalent circuit of coils.

Next, the rotating electric machine system used in the above hybrid electric vehicle is described below using FIG. 12.

The rotating electric machine system in the above hybrid electric vehicle includes: the rotating electric machine 100 that is the rear motor generator RMG; the rotating electric machine 110 that is the front motor generator FMG; the inverter power supply 230; the cable 18 that connects the rotating electric machine 100 and the inverter power supply 230; and the battery 240 that is charged at high voltage.

The inverter power supply 230 includes two inverter circuits 14, 14, each of which is subdivided into a power module and a driver unit (DU) 320. The driver unit 320 is controlled by a motor control unit (MCU) 310. Direct-current power is supplied from the battery 240 to the power module. The inverter circuits 14, 14 each convert the DC power into three-phase AC power and supply the three-phase AC power to the rotating electric machine 100, 110. When the rotating electric machine 100, 110 operates as the power generator, an AC output of the rotating electric machine is converted into DC power by the inverter power supply 230. The DC power is stored into the battery 240.

The power module of the inverter circuit 14 includes six switching elements, S1, S2, S3, S4, S5, S6, converts the DC power supplied from the battery 240, into AC power, and supplies the AC power to the rotating electric machine 100, 110. The switching elements S1, S2, S3, S4, S5, S6 are insulated-gate bipolar transistors (IGBTs) that are semiconductor-based switching elements. Instead of the IGBTs, MOS-FETs (Metal Oxide Semiconductor-Field Effect Transistors) for electric power can be used as the semiconductor-based switching elements.

IGBTs have the advantage of high operating speed. Formerly, voltages usable for power MOS-FETs have been low, so inverters for high-voltage operation have been manufactured using IGBTs. Recently, however, the voltages usable for power MOS-FETs have been enhanced and both IGBTs and power MOS-FETs can be used as semiconductor-based switching elements. Power MOS-FETs have advantages in that compared with IGBTs, these FETs are simple in semiconductor structure, and in that the manufacturing processes for semiconductors are reduced in comparison with those of IGBTs.

For an upper arm (P), collector terminals of the switching elements S1, S2, S3 (or if the switching elements are power MOS-FETs, drain terminals) are connected to one another and each is further connected to a positive electrode side of the battery 240. For a lower arm (N), emitter terminals of the switching elements S4, S5, S6 (or if the switching elements are power MOS-FETs, source terminals) are connected to one another and each is further connected to a negative electrode side of the battery 240.

A connection point between an emitter terminal of the switching element S1 of a U-phase (or if the switching element is a power MOS-FET, a source terminal) and a collector terminal of the switching element S4 (or if the switching element is a power MOS-FET, a drain terminal) is connected to a U-phase terminal of the rotating electric machine 100, 110, and a U-phase current flows. A current of a U-phase winding flows if an armature winding (a stator coil in a permanent-magnet type of synchronous motor) is Y-connected.

Similarly, a connection point between an emitter terminal of the switching element S2 of a V-phase and the switching element S5 of the V-phase is connected to a V-phase terminal of a V-phase armature coil (stator coil) in the rotating electric machine 100, 110. A connection point between an emitter terminal of the switching element S3 of a W-phase and a collector terminal of the switching element S6 of the W-phase is connected to a W-phase terminal of the rotating electric machine 100, 110.

The inverter circuit 14, after receiving DC power from the battery 240, converts the DC power into three-phase AC power. The three-phase AC power is then supplied to the U-phase, V-phase, and W-phase stator coils constituting a stator of the rotating electric machine 100, 110. Thus, a rotating magnetic field is created, whereby a rotor of the rotating electric machine 100, 110 is rotationally driven.

Also, the motor control unit (MCU) 310 controls the driver unit (DU) 320 that generates gate signals of the switching elements S1, S2, S3, S4, S5, S6. These gate signals control a conducting or non-conducting (shutoff) state of the arms, thereby to convert the DC power supplied from the battery 240, into three-phase AC power. Since generation of a three-phase alternating current is already known, detailed operational description thereof is omitted herein.

In the above-described electric machine driving system of the hybrid electric vehicle, when the rotating electric machines 100, 110 are used as the front motor generator FMG and the rear motor generator RMG, respectively, even if a high-voltage steep-fronted surge voltage is applied from inverter power supply 230, a surge voltage between turns can be reduced in comparison with a surge voltage applied when the rotating electric machine in either comparative example described above is used. Accordingly, at the same surge withstand voltage level, turn-to-turn insulation can be thinned in comparison with that of the comparative example, and the motor generators (rotating electric machines 100, 110) can be made less compact and reduced in weight and in costs. This contributes to reduction in dimensions, weight, and costs of the hybrid electric vehicle. Improvement of fuel efficiency by dimensional and weight reduction of the motor generators is also anticipated.

While a hybrid electric vehicle has been taken as an example in the description of the above rotating electric machine system, similar or equivalent advantageous effects are expected to be obtainable by using a fuel cell electric vehicle or a purely electric vehicle. When the present invention is applied to a rotating electric machine system for general industrial use, reduction in dimensions, weight, and costs of the rotating electric machine system and improvement in reliability thereof are also anticipated.

(Modification)

The present invention is not limited to/by the above embodiments and can be modified in various forms, for example, as follows:

(1) While the above embodiments have employed Y-connection, each can employ Δ-connection instead. FIG. 11A shows a Δ-connection diagram, in which a phase-to-phase coil 41 is connected between a U-phase and a V-phase, a phase-to-phase coil 42, between the V-phase and a W-phase, and a phase-to-phase coil 43, between the W-phase and the U-phase. The phase-to-phase coils 41, 42, 43 are constructed by parallel connection of three series-connected coils in four rows.

(2) While an example of a stator has been shown in each of the above embodiments, similar or equivalent advantageous effects are also obtainable for a rotor. That is to say, similar or equivalent advantageous effects are also obtainable, for example, in a secondary excitation-type induction motor or induction power generator in which an inverter surge voltage is applied to a rotor winding.

(3) In each of the above embodiments, two coil groups have been formed and the outgoing lines of the starting turns of winding and the outgoing lines of the ending turns of winding have been connected outside a slot, but three or more coil groups can also be formed. FIG. 11B, for example, shows a coil equivalent circuit of three coil groups.

In addition, for a winding machine constructed so that an N number of magnet wires taken out from an N number of bobbins are wound around a reel: after the magnet wire taken out from the nth bobbin has been wound through a required number of turns around the reel to form a first coil group, winding of the magnet wire of the (n+1)th bobbin onto the reel is started with this magnet wire positioned adjacently to the magnet wire of the ending turn of winding in the first coil group; and then after the magnet wire of the (n+1)th bobbin has been wound through the required number of turns to form a second coil group, winding of the magnet wire of the (n+2)th bobbin onto the reel is started with this magnet wire positioned adjacently to the magnet wire of the ending turn of winding in the second coil group. After the magnet wire taken out from the nth bobbin has been wound through a required number of turns around the reel to form a coil group, winding of the magnet wire of the (n+1)th bobbin is started with this magnet wire positioned adjacently to the magnet wire of the ending turn of winding in the coil group.

(4) While magnetic power was molded into dust form by compression molding in manufacturing process step S3 of FIG. 5, the magnetic powder can also be molded integrally with iron particles.

What is claimed is:

1. A rotating electric machine comprising:
    a stator core of a cylindrical shape;
    a rotor core coaxially rotating inside the stator core; and
    a plurality of coils each formed by winding a magnet wire using a slot formed axially in either the stator core or the rotor core, or both thereof;
    wherein:
    each of the coils is split into a plurality of coil groups;
    starting sections of winding of each of the magnet wires in one of the coil groups are wound adjacently to ending sections of winding of each of the magnet wires in another of the coil groups; and
    the starting sections and ending sections of winding of the magnet wires in the two coil groups are connected at respective outgoing wire ends to one another, outside the slots.

2. The rotating electric machine according to claim 1, wherein each of the coils is formed into a distributed-winding form across at least one slot by winding the magnet wires by use of slots present at both sides of each of the slots across which the coil is formed.

3. The rotating electric machine according to claim 1, wherein each of the coils is formed into a concentrated-winding form by winding the magnet wires by use of the adjacent slots.

4. The rotating electric machine according to claim 1, wherein capacitance is created between the starting turn of the magnet wire and the ending turn thereof.

5. The rotating electric machine according to claim 1, wherein a turn-to-turn surge voltage occurring when a steep-fronted surge voltage is applied to one of the coils is reduced below a turn-to-turn surge voltage occurring when the steep-fronted surge voltage is applied to one of the coils formed by winding a plurality of magnet wires together inside one of the slots.

6. The rotating electric machine according to claim 5, wherein the turn-to-turn surge voltage is reduced below a partial discharge inception voltage of turn-to-turn insulation.

7. The rotating electric machine according to claim 1, wherein, when one of the coils is impressed with a steep-fronted surge voltage of a level which causes dielectric breakdown of turn-to-turn insulation of the coil formed by winding a plurality of magnet wires together inside one of the slots, a surge voltage between turns is reduced such that the dielectric breakdown of the turn-to-turn insulation occurs after a required time has elapsed.

8. The rotating electric machine according to claim 1, wherein:
    a turn-to-turn surge voltage occurring when a steep-fronted surge voltage is applied to one of the coils is reduced below a turn-to-turn surge voltage occurring when a plurality of magnet wires are wound together inside one of the slots; and
    an inverter surge withstand voltage consequently improves.

9. The rotating electric machine according to claim 1, wherein, after being formed by winding the magnet wires, each of the coils is removed from the reel and stored into one of the slots.

10. The rotating electric machine according to claim 1, wherein the stator core or the rotor core is formed up of a plurality of split core segments.

11. The rotating electric machine according to claim 10, wherein a plurality of coil groups are formed by winding magnet wires that have been taken out from a plurality of bobbins.

12. The rotating electric machine according to claim 1, further comprising a grooved slot insulator or bobbin in each of the slots, wherein:
    the magnet wires are each disposed along the groove.

13. The rotating electric machine according to claim 1, wherein the magnet wires taken from internal different positions of a slot out to coil ends are each insulated with an insulating tube.

14. The rotating electric machine according to claim 1, further comprising an insulating tube for insulating the plurality of magnet wires together at an exit of one of the slots.

15. A rotating electric machine system, comprising:
    the rotating electric machine according to claim 1; and
    an inverter for making a speed of the rotating electric machine adjustable by converting a direct-current voltage into a multi-phase alternating-current voltage.

16. The rotating electric machine system according to claim 15, adapted to supply a direct-current voltage from a battery.

17. The rotating electric machine system according to claim 16, adapted to obtain the direct-current voltage by rectifying an alternating-current voltage into direct-current voltage form.

18. A hybrid electric vehicle comprising the rotating electric machine of claim 1.

19. A fuel cell electric vehicle comprising the rotating electric machine of claim 1.

20. An electric vehicle comprising the rotating electric machine of claim 1.

* * * * *